US006495193B2

(12) United States Patent
Hiramoto et al.

(10) Patent No.: US 6,495,193 B2
(45) Date of Patent: Dec. 17, 2002

(54) CITRUS FLAVOR HAVING HIGH STABILITY, METHOD OF PREPARATION THEREOF AND FOOD AND DRINK PRODUCT CONTAINING SAID FLAVOR

(75) Inventors: Tadahiro Hiramoto, Hiratsuka (JP); Kenji Saiki, Hiratsuka (JP); Satoshi Masumura, Hiratsuka (JP); Toru Shimizu, Hiratsuka (JP); Tomoya Yamashita, Hiratsuka (JP)

(73) Assignee: Takasago International Corporation, Tokyo (JP)

( * ) Notice: Subject to any disclaimer, the term of this patent is extended or adjusted under 35 U.S.C. 154(b) by 23 days.

(21) Appl. No.: 09/749,272

(22) Filed: Dec. 27, 2000

(65) Prior Publication Data

US 2001/0021407 A1 Sep. 13, 2001

(30) Foreign Application Priority Data

Dec. 29, 1999 (JP) .......................................... 11-377245
Dec. 29, 1999 (JP) .......................................... 11-377246

(51) Int. Cl.[7] ............................................... A23L 1/222

(52) U.S. Cl. ....................... 426/651; 426/386; 426/429; 426/616; 426/650; 426/654

(58) Field of Search ................................ 426/650, 651, 426/615, 616, 654, 386, 387, 429

(56) References Cited

U.S. PATENT DOCUMENTS

| | | | | |
|---|---|---|---|---|
| 3,997,685 A | * | 12/1976 | Strobel | 426/594 |
| 4,435,437 A | * | 3/1984 | Ziegler | 426/651 |
| 4,508,747 A | * | 4/1985 | Ziegler | 426/651 |
| 5,962,044 A | * | 10/1999 | Harris | 426/2 |

* cited by examiner

*Primary Examiner*—Leslie Wong
(74) *Attorney, Agent, or Firm*—Darby & Darby

(57) ABSTRACT

A citrus flavor has at least one of an aroma component and a water soluble citrus extract component. The citrus flavor further includes a stabilizing component. The aroma component is obtained from a low-boiling part of a cold pressed oil. The water soluble citrus extract component is obtained from a cold pressed oil by an extraction using a hydrate alcohol solvent. The stabilizing component includes a mixture of coumarin analogues obtained from a cold pressed oil. The resulting citrus flavor has a high stability.

10 Claims, 6 Drawing Sheets

Optical Deterioration of a Lemon Carbonated Drink (Key Component)

FIG. 6 OPTICAL DETERIORATION OF A LEMON CARBONATED DRINK (OFF-COMPONENT)
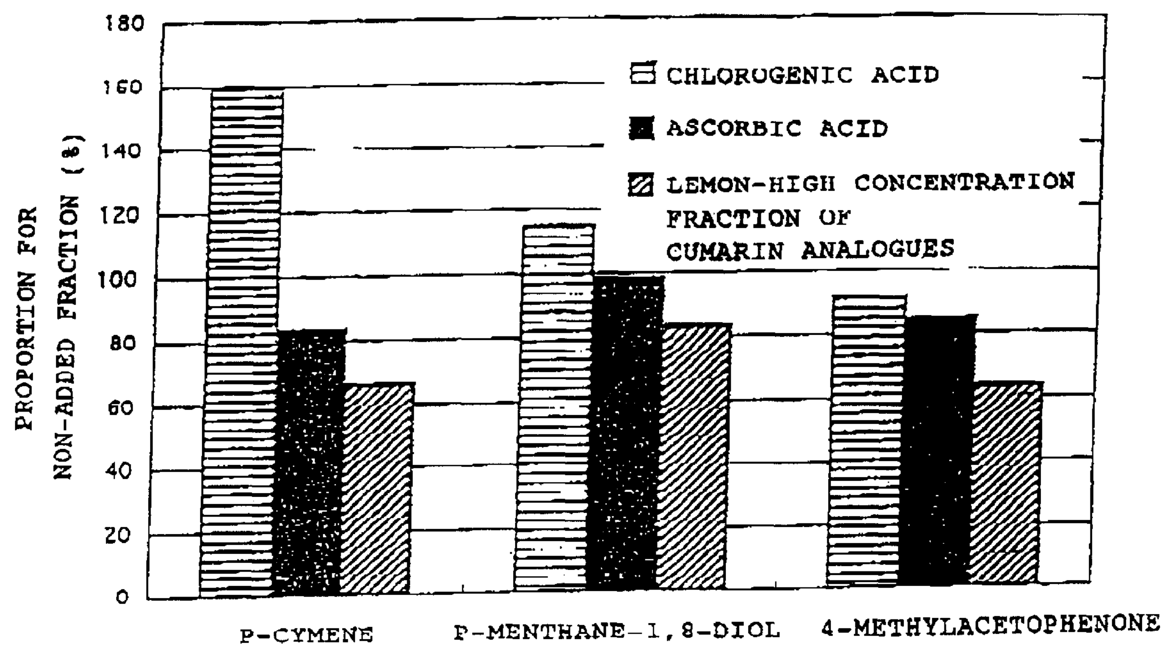

CITRUS FLAVOR HAVING HIGH STABILITY, METHOD OF PREPARATION THEREOF AND FOOD AND DRINK PRODUCT CONTAINING SAID FLAVOR

BACKGROUND OF THE INVENTION

The present invention relates to a citrus flavor comprising a flavorous component and a stabilizing component. The flavorous component is produced from a cold pressed oil which is prepared from citrus fruits. The stabilizing component comprises coumarin analogues obtained from a cold pressed oil. The flavorous component is preferably an aroma component obtained from the low-boiling fractions of the cold pressed oil or a washed oil obtained by an extraction process of the cold pressed oil. Particularly, the present invention relates to an extremely stable citrus flavor obtained by adding a particular stabilizing component which comprises a mixture of cumarin analogues, obtained by removing oxidation promoting substances existing in high-boiling fractions of the cold pressed oil, and the above aroma component or washed oil.

The present invention also relates to a processed food and drink product having these citrus flavors.

It has been known that organic substances such as oil and fats are denatured by oxygen and heat, deteriorating the qualities inherent to the organic substances. It has been known that a citrus essential oil which is widely adopted as natural flavor is also damaged by heat or the like as well as oxygen in air (e.g., *Food Industries,* vol. 32, No. 22, pp32–33). In order to decrease such oxidation as greatly as possible, an attempt is made to exploit a well known antioxidant, for example, tocopherol (described in the same reference as above). However, such an attempt has the problem that not only a relatively large amount of alpha-tocopherol must be used, but also the degree of increase in off-flavor components is high and unsatisfactory.

In the meantime, conventional techniques for the preparation of a compound having anti-oxidizing ability by using a citrus as starting material have been developed. For example, it is reported in JP-A-7-138250 that a new coumarin analogue is extracted from citrus as starting material by using a proper alkali or acid. However, this method has a disadvantage that even if such an antioxidant is used, the citrus flavor is stabilized insufficiently and it is difficult to prepare the antioxidant in a large amount. Also, when ascorbic acid is used, there is the case where it causes browning depending upon the type of processed food product.

Flavors are mostly added to and compounded in processed food products to meet recent requirements for the tastes of consumers. However, there is a problem of food flavors, used in the processing of food products, being deteriorated during the production or storage of the processed food product. This deterioration results in a spoiled taste of the processed food product. An attempt to use the aforementioned well-known antioxidant, such as BHT, alpha-tocopherol or ascorbic acid, has been made with the intention of stabilizing these processed food flavors. However, BHT and alpha-tocopherol can prevent the deterioration of the food flavors only insufficiently. Ascorbic acid sometimes causes browning depending on the type of processed food product. Furthermore, there is a fear that BHT occasionally has an adverse effect on the human body.

There is, therefore, a demand for a stabilizing agent for food flavors which prevents the deterioration of the food flavor while not damaging the outward appearance of the processed food product.

OBJECTS AND SUMMARY OF THE INVENTION

The inventors of the present invention have aimed at the development of techniques for improving the stability of citrus flavors since the citrus flavor is widely used as food flavors.

Accordingly, it is an object of the present invention to find techniques for improving the stability of aroma components or water soluble citrus extracts obtained from citrus cold pressed oil.

It is another object of the present invention is to provide a citrus flavor, which is applied to processed food and drink products, having a high stability.

It is a further object of the present invention is to provide a citrus flavor which does not impair the taste and outward appearance of processed food and drink products.

The inventors of the present invention have focused on a cold pressed oil prepared from citrus fruits which have been widely known. This inventors have made earnest studies to prepare citrus flavors which are more stable and found that a fraction obtained by first eluting high-boiling parts of the cold pressed oil, which conventionally has little utility value and are mostly disposed, with a non-polar solvent by using a silica gel column, followed by eluting these parts with a polar solvent has an effect of remarkably improving the stability, while other fractions have no effect of improving the stability but an adverse effect on the stability.

Briefly stated, the present invention provides a citrus flavor has at least one of an aroma component and a water soluble citrus extract component. The citrus flavor further includes a stabilizing component. The aroma component is obtained from a low-boiling part of a cold pressed oil. The water soluble citrus extract component is obtained from a cold pressed oil by an extraction using a hydrate alcohol solvent. The stabilizing component includes a mixture of coumarin analogues obtained from a cold pressed oil. The resulting citrus flavor has a high stability.

According to an embodiment of the present invention, there is provided a citrus flavor having one of an aroma component and a water soluble citrus extract, the aroma component obtained from a low-boiling part of a cold pressed oil, the water soluble citrus extract obtained from a cold pressed oil by an extraction using a hydrate alcohol solvent, and a stabilizing component comprising at least one coumarin analogue obtained from a cold pressed oil.

The above, and other objects, features, and advantages of the present invention will become apparent from the following description read in conjunction with the accompanying drawings, in which like reference numerals designate the same elements.

BRIEF DESCRIPTION OF THE DRAWINGS

FIG. 6 shows the ratio of each of off-flavor components which is found after a lemon carbonated drink containing 30 $\mu$g/ml of chlorogenic acid, 100 $\mu$g/ml of ascorbic acid and 0.1 $\mu$g/ml of a high concentration fraction of coumarin analogues derived from a lemon cold pressed oil and a lemon carbonated drink, excluding these antioxidants and high concentration fraction of cumar in analogues are maltreated by light in the condition of Example 17. It is noted that each value found is a relative value when the value measured of a composition, excluding the antioxidant and the high concentration fraction of coumarin analogues, is defined as 100.

DETAILED DESCRIPTION OF THE INVENTION

Figure 1:
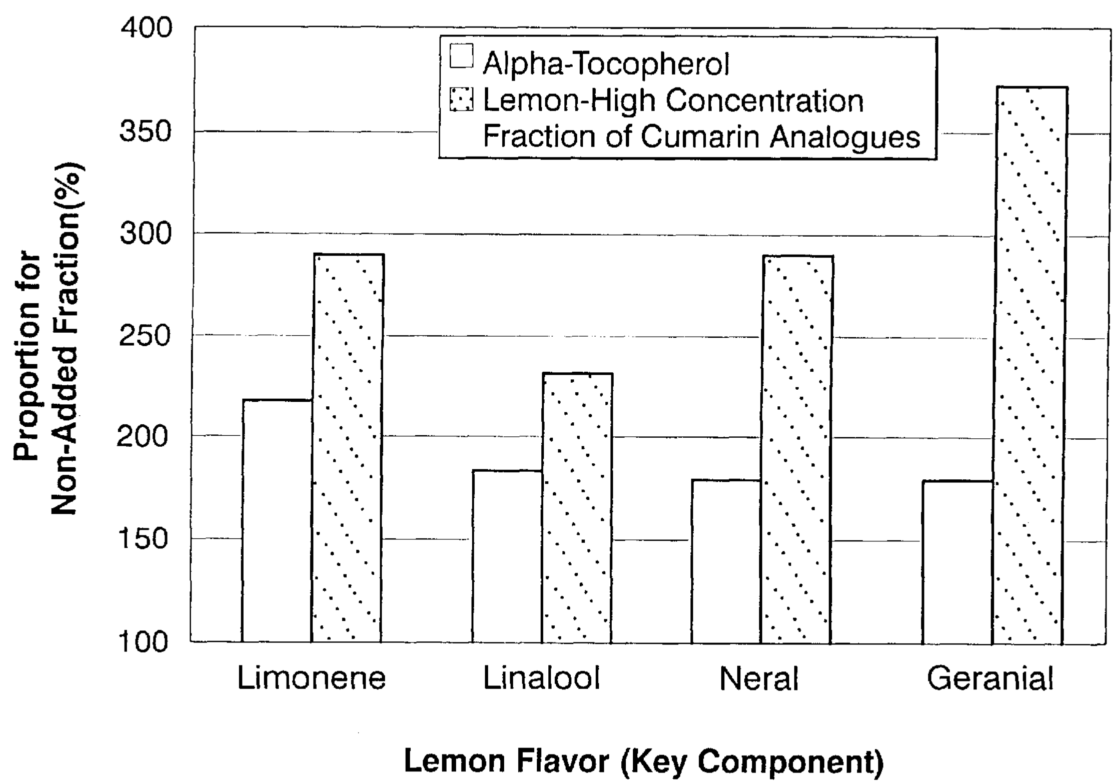
FIG. 1 shows the ratio of the amount of each of key components of a flavor which is found after an oil-soluble lemon flavor containing 0.2% of alpha-tocopherol and 0.2% of a high concentration fraction of coumarin analogues derived from a lemon cold pressed oil is thermally/oxygenically maltreated in the condition of Examples 1 and 2.

The present invention has one feature in that a highly stable citrus flavor is prepared using the so-called cold pressed oil as a starting material. The present invention comprises, as essential components, i-1)an aroma component obtained from a low-boiling part of a cold pressed oil or i-1) a water soluble citrus extract obtained from a cold pressed oil by an extraction process using a hydrate alcohol solvent as the so-called aroma component, and ii)a stabilizing component comprising coumarin analogues obtained from a cold pressed oil as the so-called stabilizing component.

First, the aroma component will be explained. A conventional is usually prepared from citrus fruits, particularly, from a peel of these citrus fruits. This cold pressed oil is, for instance, subjected to conventional distillation to obtain aroma components from a low-boiling part of the cold pressed oil. To explain in more detail, the cold pressed oil is introduced into a distiller where it is heated at 90 to 120° C. under reduced pressure. The vaporized gas is cooled and collected to give the low-boiling part of the cold pressed oil.

Next, a water soluble citrus extract obtained from the cold pressed oil by an extraction process using a hydrate alcohol solvent will be explained. The water soluble citrus extract oil is obtained by extracting the cold pressed oil with a hydrate alcohol solvent. This method is also widely known. The hydrate alcohol solvent is preferably a mixture of alcohol and water. As the alcohol, ethanol is preferable. Other solvents may be used together as far as the initial object is not spoiled. Water is compounded in the alcohol so as to amount from several percent to about 70% (by volume), preferably from 30 to 60% and more preferably from 40 to 50% in total. To explain a typical example, 1000 ml of 40% water-containing ethanol is added to 100 g of the cold pressed oil. The mixture is stirred at 0 to 10° C. for about 3 hours and is then allowed to stand. The separated water-containing ethanol part is subjected to filtration and clarification whereby the water soluble citrus extract is obtained.

Next, the stabilizing component comprising coumarin analogues obtained from the cold pressed oil will be explained. A high-boiling fraction is obtained from the aforementioned cold pressed oil by a usual method. In the present invention, the high-boiling fraction is preferably a residue left after the cold pressed oil is treated at 90 to 120° C. under reduced pressure. The high-boiling fraction is a mixture comprising non-volatile components. In succession, the high-boiling fraction is further fractionated. As a method of fractionation, a variety of methods are conventionally practical.

A method of fractionating using a silica gel chromatographic method will be explained as a typical method. First, the above high-boiling fraction may be pretreated in advance. For example, the high-boiling fraction may be heated to make it viscous or a solvent may be added to the high-boiling fraction to decrease the viscosity of the fraction. In this case, a solvent may usually be added in an amount from about 0.1 to about 30 parts by volume and preferably from about 0.5 to about 20 parts by volume based on one part of the high-boiling fraction.

Next, a method may be adopted in which the high-boiling fraction is, for example, poured into a column for silica gel chromatography which is manufactured and adjusted in advance. An eluate, constituting a solvent, is poured into the column to flow away the fraction retained temporarily in the column, together with the solvent. The discharged solvent is divided into several fractions by known measures. In this invention, as the non-polar solvent, hydrocarbons such as n-pentane, n-hexane, branched hexane, benzene and toluene may be used. Whereas esters such as methyl acetate and ethyl acetate, ethers such as ethyl ether and alcohols such as methanol, ethanol and propanol may be used as the polar solvent. However, the non-polar solvent and polar solvent used in the present invention are not limited to these exemplified solvents.

When silica gel chromatography is used, the fractions are preferably flowed away using n-hexane, ethyl acetate or a mixture of these solvents. When such a mixed solvent is used, no particular limitation is imposed on the proportion of each of these solvents. The elution is usually conducted at ambient temperature. However, there is no particular limitation to the elution temperature and the elution may be conducted at either low or high temperatures. In the present invention, it is preferable to flow away the fractions by the following method: the fractions are flowed away using, first, single n-hexane and then a mixture of n-hexane and ethyl acetate while the content of n-hexane is gradually decreased and finally only ethyl acetate. Next, the solvent flowed out by the above method is fractionated by known measures to obtain fractions. A fraction or unit of plural fractions containing much coumarin analogues is further processed under reduced pressure to distill the solvent thereby obtaining a concentrate. Thus the stabilizing component is prepared. In this case, a little solvent is allowed to remain in the concentrate. Moreover, a treating step of performing a multi-refining operation in which, for example, the concentrate is treated by high performance liquid chromatography, may be added. It is of importance to contain a mixture of coumarin analogues in a large amount. Namely, those fractions containing coumarin analogues in an amount of 60% by weight or more and more preferably 80% by weight are effective as the stabilizing component.

The stabilizing component prepared from the cold pressed oil obtained in this manner is added to or compounded in the above fragrant component, specifically the aroma component or the water soluble citrus extract, to thereby prepare a citrus flavor according to the present invention.

Particularly, the citrus flavor contains, as essential components, an aroma component, obtained from a low-boiling part of the cold pressed oil, and a stabilizing component, comprising coumarin analogues obtained from the cold pressed oil. This citrus flavor, according to the present invention, is oil-soluble. Also, the citrus flavor contains, as essential components, a water soluble citrus extract, obtained from the cold pressed oil by an extraction process using a hydrate alcohol solvent, and a stabilizing component, comprising coumarin analogues obtained from the cold pressed oil. This citrus flavor, according to the present invention, is water-soluble.

The amount of the stabilizing component to be added and compounded is preferably from about 0.001 to about 20% by weight in the oil-soluble citrus flavor and 0.01 t o 1000 $\mu$g/ml in the water-soluble citrus flavor.

In the case where the amount is out of these defined amounts, namely in the case where the amount is less than the lower limit, only insufficient stabilizing ability is obtained when the amount exceeds the upper limit. This is economically disadvantageous though high ability of stabilizing a flavor is obtained. This flavor can stand comparison in terms of flavor quality with a conventional one, namely, a flavor containing the aforementioned aroma component as an effective component and has high stability.

As examples of processed food and drink products in which the above citrus flavor is compounded, many products may be given as examples. Luxury goods, such as fruit drinks, tea, green tea, oolong tea and coffee, milky drinks, confectionery, such as gum, candy and jelly and dairy products, such as yogurt, may be exemplified.

The amount of the stabilizing agent for food flavor in processed food and drink products is generally from about 0.1 $\mu$g/L to about 1% by weight in a processed food and drink product, although it depends upon the type of processed food and drink product. The stabilizing agent may be added in a large amount. Incidentally, the stabilizing agent of the present invention is effective even in an extremely small amount.

A processed food and drink product in which the citrus flavor is compounded has a feature that the degree of deterioration of a flavor present therein is very limited. Therefore, the taste of the processed food and drink product is maintained for a long period of time, bringing about outstandingly desirable results. Also, because in the present invention, a reduction in the amount of key components of a flavor is small and the amount of off-flavor components to be generated is decreased, the present invention is advantageous to maintain the taste of processed food and drink products.

The key component of a flavor so explained here means an aroma component which is volatized by each of the processed food and drink products (or materials). The off-component of a flavor means components causing unfavorable odors among, for instance, the following products produced as a result of deterioration of fragrant components. To explain in more concretely, valencene and α-sinensal are known as the key components of a flavor and 4-vinylguaiacol and 2,5-dimethyl-4-hydroxy-3(2H)-furanone are known as the off-flavor components in orange juice. Also, neral and geranial are known as the key components of a flavor and p-cymene, p-α-dimethylstyrene, p-methylacetophenone and the like are known as the off-flavor components in lemon juice.

EXAMPLES

The present invention will be hereinafter explained in more detail by way of examples and comparative examples, which are not intended to be limiting of the present invention.

Preparation of Aroma Components

Reference Example 1—Preparation of a Lemon Aroma Component

A cold pressed oil derived from a lemon peel was placed in a heating vessel disposed in a distiller and gradually heated under reduced pressure. Volatile components were vaporized, liquefied in a cooler and stored in a receiver. When the temperature of the cold pressed oil in the heating vessel reached 120° C., the heating was stopped.

Reference Examples 2–3 Preparation of a Grapefruit Aroma Component or an Orange Aroma Component A grapefruit aroma component was obtained in the same manner as in Reference Example 1, except that cold pressed oil derived from a grapefruit peel or from an orange peel was used in place of the cold pressed oil derived from a lemon peel.

Preparation of Water Soluble Citrus Extracts

Reference Example 4—Preparation of a Lemon Water Soluble Citrus Extract

One hundred grams of a cold pressed oil derived from a lemon peel was placed in a flask, to which was added 1000 ml of 40% water-containing ethanol. The mixture was stirred at −10 to 8° C. for 3 hours. The stirring was stopped and the solution was allowed to stand. When the solution divided into two layers, the water-containing ethanol layer was collected and subjected to filtration and clarification to obtain a lemon water soluble citrus extract.

Reference Examples 5–6 Preparation of a Grapefruit Water Soluble Citrus Extract or an Orange Water Soluble Citrus Extract A cold pressed oil derived from a grapefruit peel or an orange peel was placed in a flask and the same procedures as in Reference Example 5 were carried out to obtain a grapefruit water soluble citrus extract or an orange water soluble citrus extract.

Preparation of a Stabilizing Component

Reference Example 7 Highly Concentrated Fraction or Lowly Concentrated Fraction of Coumarin Analogues Derived from a Lemon Peel One kilogram of a cold pressed oil derived from a lemon peel was placed in a heating vessel disposed in a distiller and gradually heated under reduced pressure. Volatile components were vaporized, liquefied in a cooler and stored in a receiver. When the temperature of the cold pressed oil in the heating vessel reached 120° C., the heating was stopped. The residue remaining in the heating vessel, namely, a high-boiling fraction was 67 g. A quite small amount of ethyl acetate was added to 200 g of this high-boiling fraction, which was then poured into a silica gel chromatographic column packed with 4 kg of silica gel to carry the high-boiling fraction on the silica gel. Next, the high-boiling fraction was eluted with 30 L of n-hexane to obtain a fraction 1 and in succession with 30 L of each of a mixed solvent of ethyl acetate/n-hexane (ratio by volume: 10:90), a mixed solvent of ethyl acetate/n-hexane (ratio by volume: 20:80), a mixed solvent of ethyl acetate/n-hexane (ratio by volume: 30:70), a mixed solvent of ethyl acetate/n-hexane (ratio by volume: 50:50) and ethyl acetate to obtain fractions 2, 3, 4, 5 and 6 respectively.

Each fraction was placed in an evaporator and the solvent was volatilized to obtain a dry solid substance. The amount of each fraction and the content of coumarin analogue are shown in Table 1. As to a method for measuring the content of coumarin analogues, 4 mg of the dry solid was dissolved in 50 ml of ethanol and the solution was then irradiated with ultraviolet light (wavelength: 311 nm) to find the absorption value, from which the content of coumarin analogues was determined.

TABLE 1

Yield of Each Fraction and Content (wt. %) of Coumarin Analogues

| Fraction no. | Lemon | Lime | Grapefruit | Orange |
|---|---|---|---|---|
| 1 | 30 (0) | 23 (1) | 10 (1) | 16 (1) |
| 2 | 34 (18) | 22 (31) | 50 (26) | 56 (25) |
| 3 | 20 (87) | 15 (100) | 9 (73) | 5 (95) |
| 4 | 6 (99) | 17 (100) | 16 (81) | 8 (87) |
| 5 | 5 (99) | 19 (91) | 14 (94) | 13 (99) |
| 6 | 5 (63) | 4 (89) | 1 (90) | 2 (78) |

The numerals in Table 1 show the yield of a high-boiling part and the numerals in parenthesis show the content of coumarin analogues in the fraction. A fraction prepared by putting together the dry solids obtained from each of these fractions 3, 4, 5 and 6 is designated as a high concentration fraction of coumarin analogues and is also a stabilizing component.

A fraction prepared by putting together the dry solids obtained from each of the fractions 1 and 2 is designated as a low concentration fraction of coumarin analogues.

Reference Examples 8 to 10

Reference Examples 8 to 10 refer to the preparation of high concentration fractions of coumarin analogues derived from a grapefruit peel, an orange peel and a lime peel and low concentration fractions of coumarin analogues derived from a grapefruit peel, an orange peel and a lime peel. The same procedures as in Reference Example 7 were conducted, except that cold pressed oils derived from each of a grapefruit peel, an orange peel and a lime peel were used in place of the cold pressed oil derived from a lemon peel, to obtain high concentration fractions of coumarin analogues derived from a grapefruit peel, an orange peel and a lime peel and low concentration fractions of coumarin analogues derived from a grapefruit peel, an orange peel and a lime peel.

EXAMPLES 1 and 2

Preparation of an Oil-soluble Lemon Flavor

The stabilizing component obtained from the high concentration fraction of the coumarin analogues of Reference Example 7 was added to and compounded in the lemon aroma component of Reference Example 1 such that the amount of the stabilizing component was 0.2% by weight and 0.01% by weight to prepare oil-soluble lemon flavors. Each of the above oil-soluble lemon flavors was subjected to a thermal/oxygenic maltreating test in the following conditions.

Test conditions for a thermal/oxygenic maltreating test:

Temperature: 70° C.

Air: 20 L/Hr

Maltreating time: 24 hours

The taste and aroma of this flavor treated in this test were functionally evaluated by 10 special panelists.

Functional evaluation:

□: The aroma was almost unchanged.

○: The aroma was changed a little.

Δ: The aroma was clearly changed.

X: The aroma was significantly changed.

The results obtained are shown in Table 2. The oil-soluble lemon flavor which had been subjected to the above maltreating test was then subjected to gas chromatography in the following condition to analyze the key components and off-flavor components.

Preparation of a sample: 30 μL of a methyl amyl ketone/ethanol solution (containing 7,000 μg/ml of methyl amyl ketone) was added as the internal standard substance to 1 mL of the oil-soluble lemon flavor treated in the above test to prepare a sample.

Conditions of analysis:

Column (BC-WAX (30 m×0.25 mm I.D, 0.25 μm)).

Carrier gas: Helium.

Temperature condition: 55–210° C. (temperature rise rate: 4° C./min).

Detector: FID (250° C.).

Figure 2:
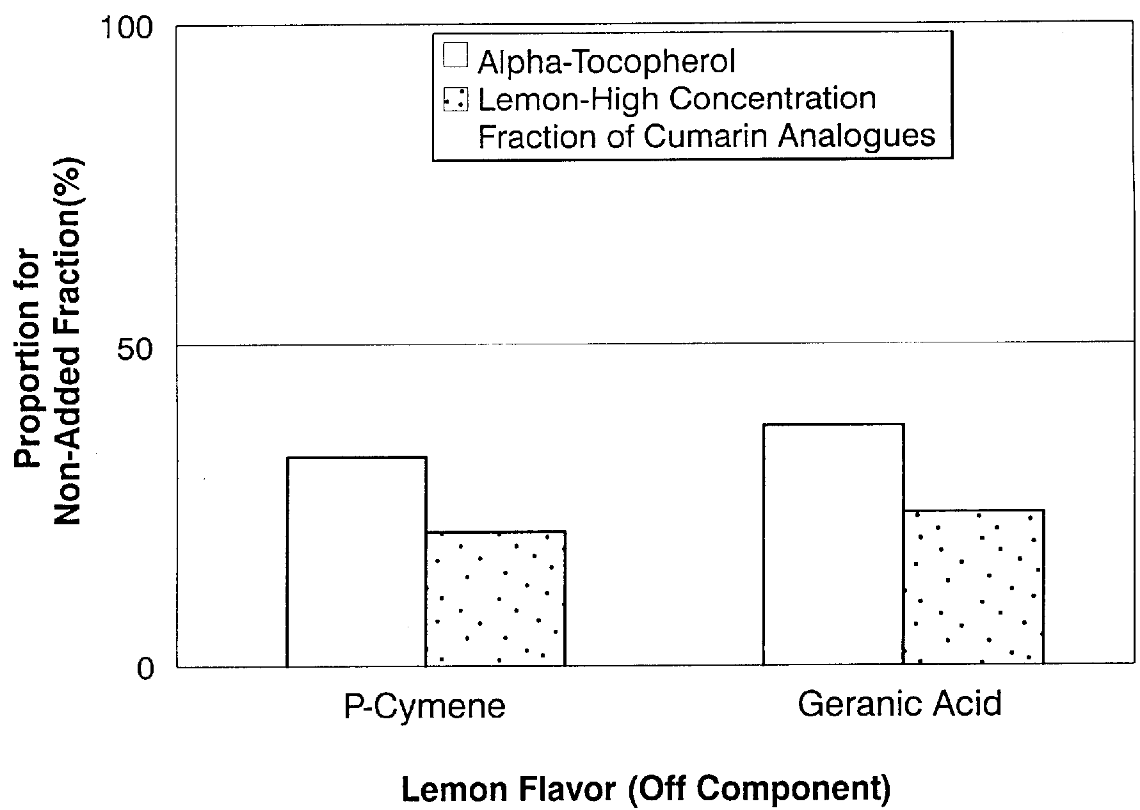
FIG. 2 shows the ratio of the amount of each of off-flavor components which is found after an oil-soluble lemon flavor containing 0.2% of alpha-tocopherol and 0.2% of a high concentration fraction of coumarin analogues derived from a lemon cold pressed oil is thermally/oxygenically maltreated in the condition of Examples 1 and 2.

The results of analysis are shown in FIGS. 1 and 2.

Comparative Examples 1 and 2

Alpha-tocopherol was added to and compounded in the lemon aroma component of Reference Example 1 such that the amount of alpha-tocopherol was 0.2% by weight and 0.01% by weight to prepare oil-soluble lemon flavors. Each of the above oil-soluble lemon flavors was subjected to a thermal/oxygenic maltreating test in the same conditions as in Examples 1 and 2 to evaluate functionally the composition. Also, the flavor which had been subjected to the above test was then analyzed for the key components and off-flavor components in the same manner as in Examples 1 and 2. The results obtained are shown in Table 2 and FIGS. 1 and 2.

Comparative Example 3

The component obtained from the low concentration fraction of coumarin analogues in Reference Example 7 was added to and compounded in the lemon aroma component of Reference Example 1 such that the amount thereof was 0.2% by weight to prepare an oil-soluble lemon flavor. The above oil-soluble lemon flavor was subjected to a thermal/oxygenic maltreating test in the same condition as in Examples 1 and 2 to evaluate functionally the composition. The results obtained are shown in Table 2.

Comparative Examples 4 and 5

The lemon aroma component derived from a lemon peel in Reference Example 1 or a cold pressed oil derived from a lemon peel was subjected to a thermal/oxygenic maltreating test in the same conditions as in Examples 1 and 2 to evaluate functionally. The results obtained are shown in Table 2.

TABLE 2

Lemon Flavor

| | Additive to CP oil aroma component | Content (%) | Functional evaluation |
|---|---|---|---|
| Comp. Ex. 1 | α-tocopherol | 0.2 | Δ |
| Comp. Ex. 2 | α-tocopherol | 0.01 | X |
| Comp. Ex. 3 | Lemon-low conc. fraction of coumarin analogues | 0.2 | X |
| Comp. Ex. 4 | No addition | — | X |
| Example 1 | Lemon-high conc. fraction of coumarin analogues | 0.2 | □ |
| Example 2 | Lemon-high conc. fraction of coumarin analogues | 0.01 | ○ |
| Comp. Ex. 5 | CP oil | — | Δ |

EXAMPLES 3 and 4

The high concentration fraction of coumarin analogues derived from grapefruit in Reference Example 8 was added to and compounded in the grapefruit aroma component of Reference Example 2 such that the amount of the fraction was 0.2% by weight an 0.01% by weight to prepare oil-soluble grapefruit flavors.

Each of the above oil-soluble grapefruit flavors was subjected to thermal/oxygenic maltreating test in the same conditions as in Examples 1 and 2 to evaluate functionally the composition. Also the flavor which had been subjected to the above test was then analyzed for the key components of a flavor in the same maimer as in Examples 1 and 2.

Comparative Examples 6 and 7

Alpha-tocopherol was added to and compounded in the grapefruit aroma component of Reference Example 2 such that the amount of alpha-tocopherol was 0.2% by weight and 0.01% by weight to prepare an oil-soluble grapefruit flavor.

Each of the above oil-soluble grapefruit flavors was subjected to a thermal/oxygenic maltreating test in the same condition as in Exampls 1 and 2 to evaluate functionally the composition. Also, the flavor which had been subjected to the above test was then analyzed for the key components of a flavor in the same manner as in Examples 1 and 2.

Comparative Example 8

The low concentration fraction of coumarin analogues in Reference Example 8 was added to and compounded in the grapefruit aroma component of Reference Example 2 such that the amount of the fraction was 0.2% by weight to prepare an oil-soluble grapefruit flavor.

The above oil-soluble grapefruit flavor was subjected to a thermal/oxygenic maltreating test in the same condition as in Examples 1 and 2 to evaluate functionally the composition. Also, the flavor which had been subjected to the above test was then analyzed for the key components of a flavor in the same manner as in Examples 1 and 2.

Figure 3:
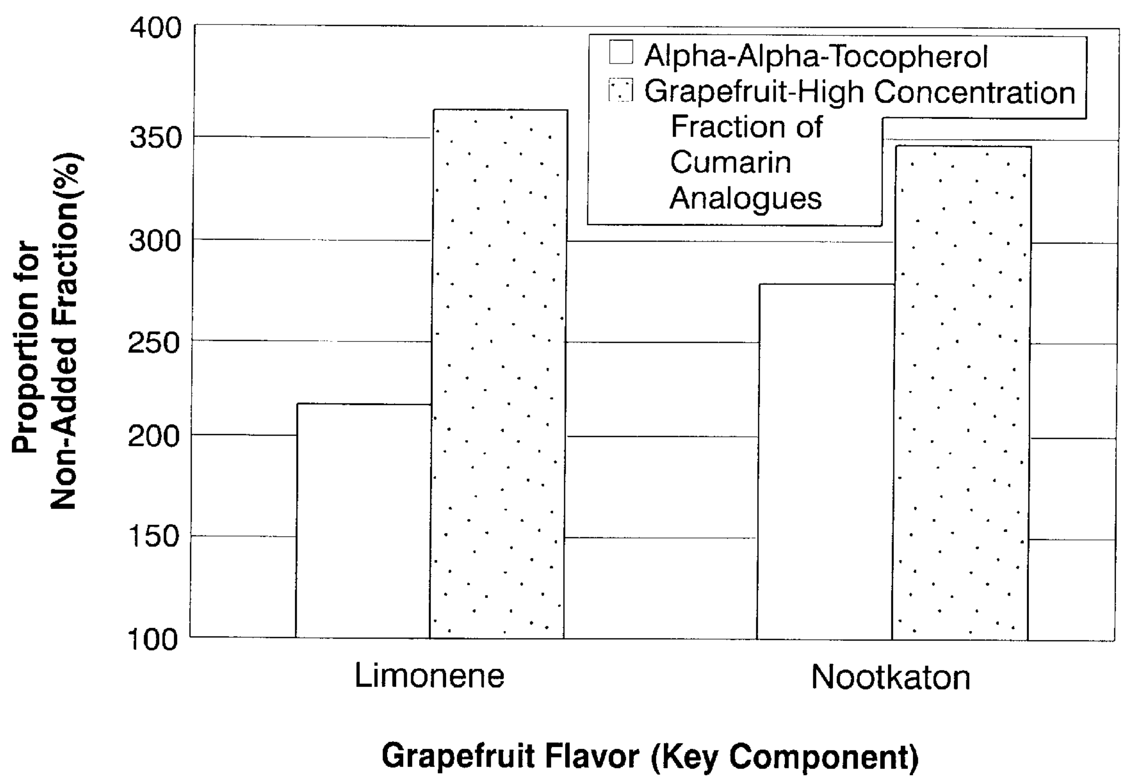
FIG. 3 shows the ratio of the amount of each of key components of a flavor which is found after an oil-soluble grapefruit flavor containing 0.2% of alpha-tocopherol and 0.2% of a high concentration fraction of coumarin analogues derived from a grapefruit cold pressed oil is thermally/oxygenically maltreated in the condition of Examples 1 and 2.

The results obtained are shown in Table and FIG. 3.

Comparative Examples 9 and 10

The grapefruit aroma component or cold pressed oil derived from a grapefruit peel in Reference Example 2 were subjected to a thermal/oxygenic maltreating test in the same condition as in Examples 1 and 2 to evaluate functionally the composition. The results obtained are shown in Table 3.

TABLE 3

Grapefruit Flavor

| | Additive to CP oil aroma component | Content (%) | Functional evaluation |
|---|---|---|---|
| Comp. Ex. 6 | α-tocopherol | 0.2 | Δ |
| Comp. Ex. 7 | α-tocopherol | 0.01 | X |
| Comp. Ex. 8 | Grapefruit-low conc. fraction of coumarin analogues | 0.2 | X |
| Comp. Ex. 9 | No addition | — | X |
| Example 3 | Grapefruit-high conc. fraction of coumarin analogues | 0.2 | □ |
| Example 4 | Grapefruit-high conc. fraction of coumarin analogues | 0.01 | ○ |
| Comp. Ex. 10 | CP oil | — | Δ |

EXAMPLES 5 and 6

Preparation of an Oil-soluble Orange Flavor

The high concentration fraction of coumarin analogues derived from an orange peel used in Reference Example 9 was added to and compounded in the orange flavor aroma component of Reference Example 3 such that the amount of the fraction was 0.2% by weight and 0.01% by weight to prepare oil-soluble orange flavors.

Each of the above oil-soluble orange flavors was subjected to a thermal/oxygenic maltreating test in the same condition as in Examples 1 and 2 to evaluate functionally the composition. Also, the flavor which had been subjected to the above test was then analyzed for the key components of a flavor in the same manner as in Examples 1 and 2.

Figure 4:
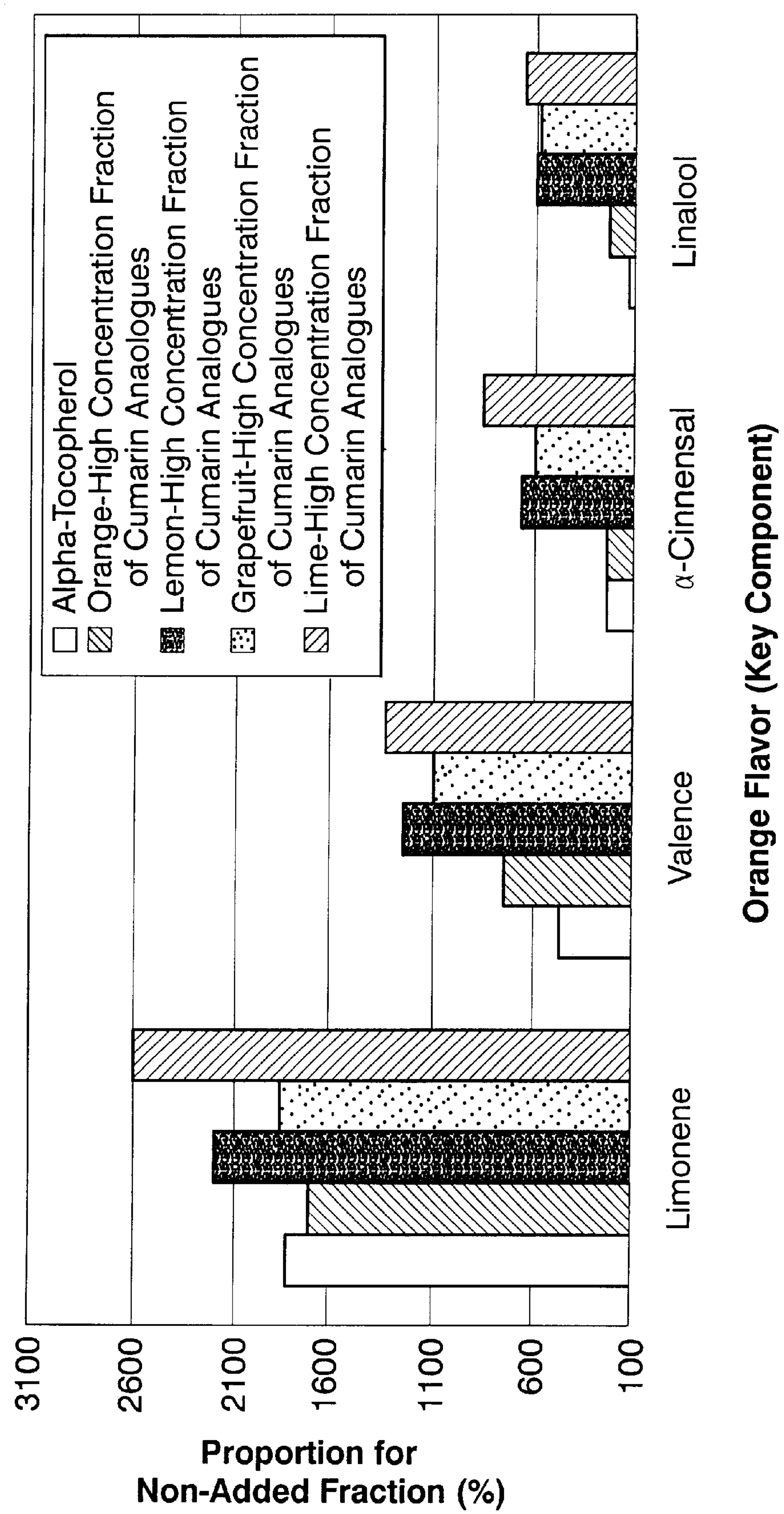
FIG. 4 shows the ratio of the amount of each of key components of a flavor which is found after an oil-soluble orange flavor containing 0.2% of alpha-tocopherol, 0.2% of a high concentration fraction of coumarin analogues derived from a lemon cold pressed oil, 0.2% of a high concentration fraction of coumarin analogues derived from a orange cold pressed oil, 0.2% of a high concentration fraction of coumarin analogues derived from a grapefruit cold pressed oil and 0.2% of a high concentration fraction of coumarin analogues derived from a lime cold pressed oil, is thermally and oxygenically maltreated in the condition of Examples 1 and 2. It is to be noted that each value found is a relative value when the value measured of a composition, excluding the antioxidant and the citrus oil-soluble flavor, is defined as 100.

The results obtained are shown in Table 4 and FIG. 4.

Comparative Examples 11 and 12

Alpha-tocopherol was added to and compounded in the orange aroma component of Reference Example 3 such that the amount of alpha-tocopherol was 0.2% by weight and 0.01% by weight to prepare oil-soluble orange flavors.

Each of the above oil-soluble orange flavors was subjected to a thermal/oxyenic maltreating test in the same condition as in Examples 1 and 2 to evaluate functionally the composition. Also, the flavor which had been subjected to the above test was then analyzed for the key components of a flavor in the same manner as in Examples 1 and 2.

The results obtained are shown in Table 4 and FIG. 4.

Comparative Example 13

The low concentration fraction of coumarin analogues in Reference Example 9 was added to and compounded in the orange aroma component of Reference Example 3 such that the amount of the fraction was 0.2% by weight to prepare an oil-soluble orange flavor.

The above oil-soluble orange flavor was subjected to a thermal/oxygenic maltreating test in the same condition as in Examples 1 and 2 to evaluate functionally the composition.

The results obtained are shown in Table 4.

Comparative Examples 14 and 15

The orange aroma component or cold pressed oil derived from an orange peel in Reference Example 3 were subjected to a thermal/oxygenic maltreating test in the same conditions as in Examples 1 and 2 to evaluate functionally the composition.

The results obtained are shown in Table 4.

EXAMPLES 7 to 12

Preparation of Oil-soluble Orange Flavors

Each of the high concentration fraction of coumarin analogues derived from a lemon peel which was prepared in Reference Example 7, the high concentration fraction of coumarin analogues derived from grapefruit which was prepared in Reference Example 8, the high concentration fraction of coumarin analogues derived from an orange peel which was prepared in Reference Example 9, and the high concentration fraction of coumarin analogues derived from a lime peel which was prepared in Reference Example 10 was added to and compounded in the orange aroma component of Reference Example 3 in amounts of 0.2% by weight and 0.01 by weight to prepare oil-soluble orange flavors.

The above oil-soluble orange flavor was subjected to a thermal/oxygenic maltreating test in the same condition as in Examples 1 and 2 to evaluate functionally the composition.

The results obtained are shown in Table 4.

TABLE 4

Orange Flavors

| | Additive to CP oil aroma component | Content (%) | Functional evaluation |
|---|---|---|---|
| Comp. Ex. 11 | α-tocopherol | 0.2 | Δ |
| Comp. Ex. 12 | α-tocopherol | 0.01 | X |
| Comp. Ex. 13 | Orange-low conc. fraction of coumarin analogues | 0.2 | X |
| Comp. Ex. 14 | No addition | — | X |
| Example 5 | Orange-high conc. fraction of coumarin analogues | 0.2 | ○ |
| Example 6 | Orange-high conc. fraction of coumarin analogues | 0.01 | Δ |
| Example 7 | Lemon-high conc. fraction of coumarin analogues | 0.2 | □ |
| Example 8 | Lemon-high conc. fraction of coumarin analogues | 0.01 | ○ |
| Example 9 | Grapefruit-high conc. fraction of coumarin analogues | 0.2 | □ |
| Example 10 | Grapefruit-high conc. fraction of coumarin analogues | 0.01 | ○ |
| Example 11 | Lime-high conc. fraction of coumarin analogues | 0.2 | □ |
| Example 12 | Lime-high conc. fraction of coumarin analogues | 0.01 | ○ |
| Comp. Ex. 15 | CP oil | — | Δ |

EXAMPLE 13

Chewing Gum

A chewing gum containing the oil-soluble orange flavor prepared in Example 5 was prepared according to the following formulation.

| | |
|---|---|
| Gum base | 315 g |
| Powder sugar | 990 g |
| Starch syrup | 195 g |
| Oil-soluble orange flavor | 1% |
| Citric acid | 1% |

Preparing method: The gum base, powder sugar and starch syrup were thoroughly kneaded by a kneader. Citric acid was added to the mixture and the kneading was continued. Then the flavor was added to the resulting mixture and the kneading was continued to knead the mixture (50° C., 30 min) sufficiently. This kneaded material was subjected to extrusion treatment to obtain a 10-mm-wide, 50-mm-long and 0.2-mm-thick plate-like chewing gum.

This chewing gum was subjected to a maltreating test in the following condition.

Condition of a thermal maltreating test:

Temperature: 40° C.

Humidity: 70%, stored for one month.

The taste and aroma of this chewing gum treated in this test were functionally evaluated by 10 special panelists.

Functional evaluation:

□: The taste and the aroma were almost unchanged.

○: The taste and the aroma were changed a little.

Δ: Clear change in the taste and aroma.

X: The taste and the aroma were significantly changed.

The results obtained are shown in Table 5.

EXAMPLE 14

Chewing Gum

A chewing gum containing the oil-soluble orange flavor prepared in Example 7 in place of the oil-soluble orange flavor prepared in Example 5 was prepared. The chewing gum was subjected to a maltreating test made in the same condition as in Example 13. The resulting chewing gum was functionally evaluated in the same condition as in Example 13. The results obtained are shown in Table 5.

Comparative Example 16

A chewing gum was obtained in the same manner as in Example 13 except that a material obtained by containing 0.2% by weight of alpha-tocopherol in the orange aroma component of Reference Example 3 was used in place of the oil-soluble orange flavor used in the chewing gum of Example 13. The chewing gum was subjected to a maltreating test made in the same condition as in Example 13. The resulting chewing gum was functionally evaluated in the same condition as in Example 13. The results obtained are shown in Table 5.

Comparative Examples 17 and 18

A chewing gum was obtained in the same manner as in Example 13 except that a flavor containing the low concentration fraction of coumarin analogues derived from an orange peel which was used in Reference Example 9 or the low concentration fraction of coumarin analogues derived from a lemon peel which was used in Reference Example 7 in an amount of 0.2% by weight in place of the high concentration fraction of coumarin analogues contained in the oil-soluble orange flavor was used in the chewing gum of Example 13. The chewing gum was subjected to a maltreating test made in the same condition as in Example 13. The resulting chewing gum was functionally evaluated in the same condition as in Example 13. The results obtained are shown in Table 5.

Comparative Example 19

A chewing gum was obtained in the same manner as in Example 13 except that cold pressed oil was used in place of the oil-soluble orange flavor used in the chewing gum of Example 5. The chewing gum was subjected to a maltreating test made in the same condition as in Example 13. The resulting chewing gum was functionally evaluated in the same condition as in Example 13. The results obtained are shown in Table 5.

TABLE 5

| | Additive to CP oil aroma component | Content (μg/g) | Functional evaluation |
|---|---|---|---|
| Comp. Ex. 16 | α-tocopherol | 20 | Δ |
| Comp. Ex. 17 | Orange-low conc. fraction of coumarin analogues | 20 | X |
| Comp. Ex. 18 | Lemon-low conc. fraction of coumarin analogues | 20 | X |
| Comp. Ex. 19 | Orange CP oil | — | X |
| Example 13 | Orange-high conc. fraction of coumarin analogues | 20 | ○ |
| Example 14 | Lemon-high conc. fraction of coumarin analogues | 20 | □ |

EXAMPLES 15 and 16

Preparation of a Water-soluble Lemon Flavor

The high concentration fraction of coumarin analogues derived from a lemon peel which was obtained in Reference Example 7 was added to and compounded in the lemon water soluble citrus extract obtained in Reference Example 4 such that the amount of the fraction was 100 μg/ml and 10 μg/ml to prepare water-soluble lemon flavors.

EXAMPLES 17 and 18

Preparation of Lemon Carbonated Drinks

A carbonated drink (Brix: 10.0, gas pressure: 2.5 kg/cm$^2$ and acidity (converted to citric acid): 0.38) containing the water-soluble lemon flavor prepared in Example 15 or 16 was prepared according to the following formulation.

| Lemon carbonated drink: | |
|---|---|
| Fructose-glucose-liquid sugar | 127.0 g |
| Citric acid | 1.24 g |
| Water | 200 g |
| Water-soluble lemon flavor | 1 g |
| Carbonated water | Proper amount |
| Total | 1,000 ml |

Method of preparation: The fructose-glucose-liquid sugar and citric acid were dissolved in water to obtain a syrup. The water-soluble lemon flavor was added to the syrup and the mixture was stirred. Then, carbonated water was added to the mixture such that the total volume became 1,000 ml. This carbonated drink was subjected to an optical maltreating test made in the following condition to evaluate functionally the composition.

Condition of optical maltreating test:

Temperature: 20° C.

15000 Lux·Hr.

Irradiated for 7 days.

The taste and aroma of a flavor of this carbonated drink treated in this test were functionally evaluated by 10 special panelists.

Functional evaluation:

□: The aroma and taste were almost unchanged.

○: The aroma and taste were changed a little.

Δ: The aroma and taste were clearly changed.

X: The aroma and taste were significantly changed.

The results obeatined are shown in Table 6.

The carbonated drink which had been subjected to the above optical maltreating test was then subjected to gas chromatography in the following conditions to analyze the key components and off-flavor components.

Preparation of a sample: 30 μL of a methyl amyl ketone/ethanol solution (containing 3,000 μg/ml of methyl amyl ketone) was added to 1 L of the carbonated drink treated in the above test to prepare a sample.

Condition of analysis:

Column: BC-WAX (30 m×0.25 mm I.D, 0.25 μm)

Carrier gas: Helium

Temperature condition: 55–210° C. (temperature rise rate: 4° C./min).

Detector: FID (250° C.)

Figure 5:
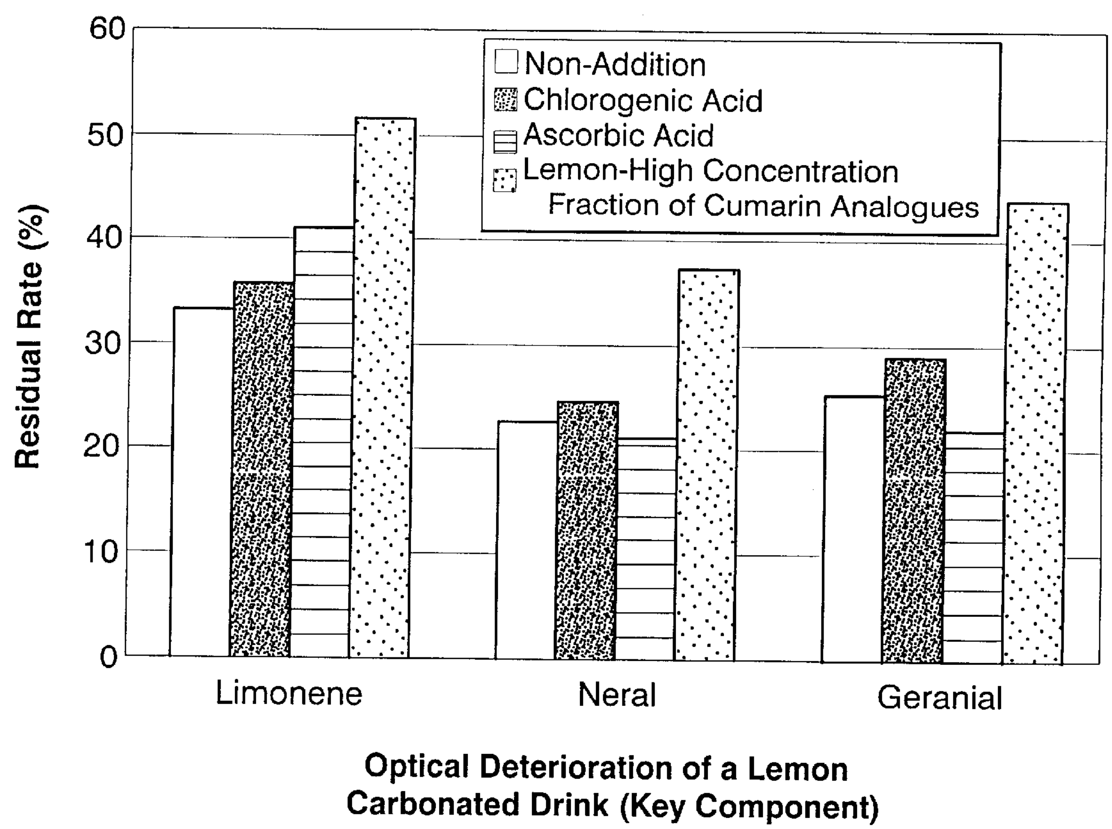
FIG. 5 shows the ratio of each of key components of a flavor which is found after a lemon carbonated drink containing 30 $\mu$g/ml of chlorogenic acid, 100 $\mu$g/ml of ascorbic acid and 0.1 $\mu$g/ml of a high concentration fraction of coumarin analogues derived from a lemon cold pressed oil and a lemon carbonated drink, excluding these antioxidants and high concentration fraction of coumarin analogues are maltreated by light in the condition of Example 17.

The results obtained are shown in FIGS. 5 and 6.

Comparative Example 20

The same procedures were conducted in the same manner as in Example 17, except that the lemon water soluble citrus extract of Reference Example 4 was used as the water-soluble lemon flavor in the lemon carbonated drink of Example 17, to produce a carbonated drink. The carbonated drink was subjected to an optical maltreating test made in the same condition as in Example 17 to evaluate functionally the composition. Also, the carbonated drink which was treated in the above test was analyzed for the key components and off-flavor components in the same method as in the aforementioned Example 17.

The results obtained are shown in Table 6, and FIGS. 5 and 6.

Comparative Examples 21 and 22

Chlorogenic acid was added to and compounded in the lemon carbonated drink of Comparative Example 20 such that the amount of the acid was 50 μg/ml and 30 μg/ml to prepare carbonated drinks. This carbonated drink was subjected to an optical maltreating test in the same condition as in Example 17 to evaluate functionally the composition. Also, the carbonated drink which had been subjected to the above test was then analyzed for the key components and off-flavor components in the same manner as in Example 17.

The results obtained are shown in Table 6, and FIGS. 5 and 6.

Comparative Example 23

Ascorbic acid was added to and compounded in the lemon carbonated drink of Comparative Example 20 such that the amount of the acid was 100 μg/ml to prepare a carbonated drink. This carbonated drink was subjected to an optical maltreating test in the same condition as in Example 17 to evaluate functionally the composition. Also, the carbonated drink which had been subjected to the above test was then analyzed for the key components and off-flavor components in the same manner as in Example 17.

The results obtained are shown in Table 6, and FIGS. 5 and 6.

TABLE 6

| Optical Maltreating Test | | | |
|---|---|---|---|
| | | Content (μg/ml) | Functional evaluation |
| Comp. Ex. 20 | No addition | — | X |
| Comp. Ex. 21 | Chlorogenic acid | 50 | ○ |
| Comp. Ex. 22 | Chlorogenic acid | 30 | X |
| Comp. Ex. 23 | Ascorbic acid | 100 | X |
| Example 17 | Lemon-high conc. fraction of coumarin analogues | 0.1 | □ |
| Example 18 | Lemon-high conc. fraction of coumarin analogues | 0.01 | ○ |

EXAMPLES 19 and 20

The lemon carbonated drink prepared in Example 17 was subjected to a thermal maltreating test according to the following conditions.

Condition of thermal maltreating test:

Temperature: 37° C.

Stored in the darkness for 7 days.

The taste and aroma of the lemon carbonated drink treated in this test were functionally evaluated in the same method as in Example 17. The results obtained are shown in Table 7.

Comparative Example 24

The lemon carbonated drink of Comparative Example 20 was subjected to the thermal maltreating test adopted in Example 19. The resulting carbonated drink was functionally evaluated in the same method as in Example 17. The results obtained are shown in Table 7.

Comparative Example 25

Chlorogenic acid was added to and compounded in the lemon carbonated drink of Comparative Example 20 such that the amount of the acid was 100 μg/ml to prepare a carbonated drink. The thermal maltreating test adopted in Example 19 was made. The resulting carbonated drink was functionally evaluated in the same method as in Example 17. The results obtained are shown in Table 7.

Comparative Example 26

The lemon carbonated drink of Comparative Example 23 was subjected to the thermal maltreating test adopted in Example 19. The resulting carbonated drink was functionally evaluated in the same method as in Example 17. The results obtained are shown in Table 7.

TABLE 7

| Optical Maltreating Test | | | |
|---|---|---|---|
| | | Content (μg/ml) | Functional evaluation |
| Comp. Ex. 24 | No addition | — | X |
| Comp. Ex. 25 | Chlorogenic acid | 100 | X |
| Comp. Ex. 26 | Ascorbic acid | 100 | X |
| Example 19 | Lemon-high conc. fraction of coumarin analogues | 0.1 | □ |
| Example 20 | Lemon-high conc. fraction of | 0.01 | ○ |

EXAMPLE 21

Preparation of a Water-soluble Grapefruit Flavor

The high concentration fraction of coumarin analogues derived from grapefruit which was obtained in Reference Example 8 was added to and compounded in the grapefruit water soluble citrus extract obtained in Reference Example 5 such that the amount of the fraction was 0.05 μg/ml to prepare a water-soluble grapefruit flavor.

EXAMPLE 22

Preparation of a grapefruit Ade

A grapefruit ade (Brix: 11.0 and acidity (converted to citric acid): 0.5) containing the water-soluble grapefruit flavor obtained in Example 21 was prepared according to the following formulation.

| Grapefruit ade: | |
|---|---|
| Fructose-glucose-liquid sugar | 107.0 g |
| Citric acid | 2.0 g |
| Sodium citrate | 0.9 g |
| Grapefruit concentrated fruit juice | 41.9 g |
| Water-soluble grapefruit flavor | 1 g |
| Water | Proper amount |
| Total | 1,000 ml |

Method of preparation: The fructose-glucose-liquid sugar, citric acid and sodium citrate were dissolved in water to obtain a syrup. The grapefruit concentrated fruit juice and the water-soluble grapefruit flavor were added to the syrup and the mixture was stirred. Then, water was added to the mixture such that the total volume became 1,000 ml. This grapefruit ade was subjected to the optical maltreating test adopted in Example 17 and the resulting ade was functionally evaluated in the same method as in Example 17. Also, this grapefruit ade was subjected to the thermal maltreating test adopted in Example 19 and the resulting ade was functionally evaluated in the same method as in Example 17.

The results obtained are shown in Table 8.

Comparative Example 27

The same procedures as in Example 20 were conducted, except that the water-soluble grapefruit water soluble citrus extract of Reference Example 5 was used in place of the water-soluble grapefruit flavor used in the grapefruit ade of Example 22, to prepare a grapefruit ade. This ade was subjected to an optical maltreating test in the same condition as in Example 17 to evaluate functionally. Also, this ade was subjected to a thermal maltreating test in the same condition as in Example 19 to evaluate functionally. The results obtained are shown in Table 8.

Comparative Example 28

The same procedures as in Example 8 were conducted, except that 50 μg/ml of the low concentration fraction of coumarin analogues derived from grapefruit which was obtained in Reference Example 8 was used in place of the high concentration fraction of coumarin analogues contained in the water-soluble grapefruit flavor in the grapefruit ade of Example 22, to prepare a grapefruit ade. This ade was subjected to an optical maltreating test in the same condition as in Example 17 to evaluate functionally. Also, this ade was subjected to a thermal maltreating test in the same condition as in Example 19 to evaluate functionally. The results obtained are shown in Table 8.

TABLE 8

| | | Content (μg/ml) | Functional evaluation |
|---|---|---|---|
| | Optical Maltreating Test | | |
| Comp. Ex. 27 | Grapefruit water soluble citrus extract | — | X |
| Comp. Ex. 28 | Grapefruit-low conc. fraction of coumarin analogues | 0.05 | X |
| Example 22 | Grapefruit-high conc. fraction of coumarin analogues | 0.05 | □ |
| | Thermal Maltreating Test | | |
| Comp. Ex. 27 | Grapefruit water soluble citrus extract | — | X |
| Comp. Ex. 28 | Grapefruit-low conc. fraction of coumarin analogues | 0.05 | X |
| Example 22 | Grapefruit-high conc. fraction of coumarin analogues | 0.05 | □ |

EXAMPLE 23

Preparation of a Water-soluble Orange Flavor

The high concentration fraction of coumarin analogues derived from an orange peel which was obtained in Reference Example 9 was added to and compounded in the orange water soluble citrus extract obtained in Reference Example 9 such that the amount of the fraction was 50 μg/ml to prepare a water-soluble orange flavor.

EXAMPLE 24

Preparation of an Orange Ade

An orange ade (Brix: 10.8 and acidity (converted to citric acid): 0.38) containing the water-soluble orange flavor obtained in Example 23 was prepared according to the following formulation.

| Orange ade: | |
|---|---|
| Fructose-glucose-liquid sugar | 107.0 g |
| Citric acid | 1.0 g |
| Sodium citrate | 0.3 g |
| Orange concentrated fruit juice | 51.8 g |
| Water-soluble orange flavor | 1.0 g |
| Water | Proper amount |
| Total | 1,000 ml |

Method of preparation: The fructose-glucose-liquid sugar, citric acid and sodium citrate were dissolved in water to obtain a syrup. The orange concentrated fruit juice and the water-soluble orange flavor were added to the syrup and the mixture was stirred. Then water was added to the mixture such that the total volume became 1,000 ml.

This orange ade was subjected to the optical maltreating test adopted in Example 17 and the resulting ade was functionally evaluated in the same method as in Example 17. Also, this ornage ade was subjected to the thermal maltreating test adopted in Example 4 and the resulting ade was functionally evaluated in the same method as in Example 17. The results obtained are shown in Table 9.

Comparative Example 29

The same procedures as in Example 24 were conducted, except that the water-soluble orange flavor water soluble citrus extract of Reference Example 9 was used in place of the water-soluble orange flavor used in the orange ade of Example 24, to prepare an orange ade. This ade was subjected to an optical maltreating test in the same condition as in Example 17 to evaluate functionally the composition. Also, this ade was subjected to a thermal maltreating test in the same condition as in Example 19 to evaluate functionally the composition. The results obtained are shown in Table 9.

Comparative Example 30

The same procedures as in Example 22 were conducted, except that 50 μg/ml of the low concentration fraction of coumarin analogues derived from ornage which was obtained in Reference Example 10 was used in place of the high concentration fraction of coumarin analogues in the orange ade of Example 24, to prepare an orange ade. This ade was subjected to an optical maltreating test in the same condition as in Example 17 to evaluate functionally the composition. Also, this ade was subjected to a thermal maltreating test in the same condition as in Example 19 to evaluate functionally the composition. The results obtained are shown in Table 9.

TABLE 9

| | | Content (μg/ml) | Functional evaluation |
|---|---|---|---|
| | Optical Maltreating Test | | |
| Comp. Ex. 29 | Orange water soluble citrus extract | — | X |
| Comp. Ex. 30 | Orange-low conc. fraction of coumarin analogues | 0.05 | X |
| Example 24 | Orange-high conc. fraction of coumarin analogues | 0.05 | □ |
| | Thermal Maltreating Test | | |
| Comp. Ex. 29 | Orange water soluble citrus extract | — | X |
| Comp. Ex. 30 | Orange-low conc. fraction of coumarin analogues | 0.05 | X |
| Example 24 | Orange-high conc. fraction of coumarin analogues | 0.05 | □ |

According to the present invention, a citrus flavor containing a mixture of coumarin analogues is obtained which are highly stable. Processed food and drink products in which this flavor is compounded are superior in the stability of a flavor and keep the taste for a long period of time. Also, in confectionery, such as chewing gum and jelly, containing the flavor of the present invention, a reduction in the key components of a flavor is small and the generation of off-flavor components is also small. Therefore, the taste of the processed food and drink products is maintained for a long period of time and hence significantly desirable results are brought about. Moreover, according to the present invention, a high-boiling fraction of a cold pressed oil which fraction has been mostly disposed can be utilized.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A citrus flavor comprising:

one of an aroma component and a water soluble citrus extract;

said aroma component obtained from a low-boiling part of a cold pressed oil;

said water soluble citrus extract obtained from a cold pressed oil by an extraction using a hydrate alcohol solvent; and a stabilizing component comprising at least one coumarin analogue obtained from a cold pressed oil.

2. A citrus flavor according to claim 1, wherein said stabilizing component comprises a mixture of coumarin analogues obtained from a high-boiling part of said cold pressed oil.

3. A citrus flavor according to claim 1, wherein said stabilizing component is obtained from a fraction produced by carrying a high-boiling part of said cold pressed oil on a support, followed by eluting the high-boiling part with a solvent.

4. A citrus flavor according to claim 3, wherein said fraction is eluted with a polar solvent or a mixture solvent of a polar solvent and a non-polar solvent.

5. A citrus flavor according to claim 3, wherein said stabilizing component obtained from the fraction comprises a mixture of coumarin analogues in an amount of greater than about 60% by weight.

6. A citrus flavor according to claim 4, wherein said stabilizing component obtained from the fraction comprises a mixture of coumarin analogues in an amount of greater than about 60% by weight.

7. A method of preparing a citrus flavor comprising:

preparing at least one of an aroma component, from a low-boiling part of the cold pressed oil, or a water soluble citrus extract, from the cold pressed oil by an extraction using a hydrate alcohol solvent;

preparing a fraction comprising 60% by weight or more of a mixture of coumarin analogues by carrying a high-boiling part of said cold pressed oil on a support; and eluting the high-boiling part with a solvent and mixing said aroma component or water soluble citrus extract with said fraction.

8. A processed food and drink product comprising the citrus flavor as claimed in claim 1.

9. A citrus flavor formed by the process of:

mixing one of an aroma component and a water soluble citrus extract with a stabilizing component comprising at least one coumarin analogue obtained from a cold pressed oil;

said aroma component obtained from a low-boiling part of a cold pressed oil; and said water soluble citrus extract obtained from a cold pressed oil by an extraction using a hydrate alcohol solvent.

10. A method of using the citrus flavor as claimed in claim 1 by administering an effective quantity of said citrus flavor to a product in need thereof.

* * * * *